(12) United States Patent
Serbinski (10) Patent No.: US 8,191,912 B2
(45) Date of Patent: Jun. 5, 2012

(54) MOTORCYCLE FENDER EXTENSION FOR DRILLESS ASSEMBLY

(76) Inventor: Andrew Serbinski, Frenchtown, NJ (US)

( * ) Notice: Subject to any disclaimer, the term of this patent is extended or adjusted under 35 U.S.C. 154(b) by 197 days.

(21) Appl. No.: 12/804,176

(22) Filed: Jul. 15, 2010

(65) Prior Publication Data

US 2012/0013096 A1 Jan. 19, 2012

(51) Int. Cl.
*B62D 25/16* (2006.01)
(52) U.S. Cl. ..................... 280/152.1; 280/852
(58) Field of Classification Search .............. 280/152.1, 280/152.2, 152.3, 159, 160, 160.1, 288.4, 280/304.3, 727, 728.2, 847, 851, 852, 854; 180/218, 225; 293/155
See application file for complete search history.

(56) References Cited

U.S. PATENT DOCUMENTS

| | | | | |
|---|---|---|---|---|
| 1,374,475 A * | 4/1921 | Shaughnessy | ............... | 296/78.1 |
| D129,102 S * | 8/1941 | Comiskey | ............... | D12/186 |
| D151,122 S * | 9/1948 | Firth | ............... | D12/186 |
| 3,934,900 A | 1/1976 | Wilson | | |
| 4,169,608 A | 10/1979 | Logan | | |
| 4,422,659 A * | 12/1983 | Nebu | ............... | 280/152.1 |
| 4,620,713 A * | 11/1986 | Sakaguchi | ............... | 280/152.3 |
| 4,688,814 A * | 8/1987 | Arenhold | ............... | 280/851 |
| D293,312 S * | 12/1987 | Stahel | ............... | D12/186 |
| 4,735,427 A * | 4/1988 | Fuchs | ............... | 280/847 |
| 5,120,082 A * | 6/1992 | Ito | ............... | 280/851 |
| 5,354,082 A * | 10/1994 | Tsai | ............... | 280/152.1 |
| 6,435,533 B1 * | 8/2002 | Chuang | ............... | 280/152.1 |
| 6,634,664 B1 * | 10/2003 | Kojima | ............... | 280/288.4 |
| 6,702,311 B2 * | 3/2004 | Tsukiji | ............... | 280/152.2 |
| 7,032,915 B2 * | 4/2006 | Bedard et al. | ............... | 280/288.4 |
| 7,090,235 B2 * | 8/2006 | Takemura et al. | ............... | 280/152.2 |
| 7,114,749 B2 * | 10/2006 | Ward | ............... | 280/848 |
| 7,222,884 B2 * | 5/2007 | Callan et al. | ............... | 280/848 |
| 7,252,171 B2 * | 8/2007 | Augustine, Jr. | ............... | 180/219 |
| 7,635,140 B2 * | 12/2009 | Konno et al. | ............... | 280/152.1 |
| D635,496 S * | 4/2011 | Serbinski | ............... | D12/186 |
| 7,976,041 B2 * | 7/2011 | Chuang | ............... | 280/152.1 |
| 8,016,307 B2 * | 9/2011 | Adachi et al. | ............... | 280/152.1 |
| 2003/0047934 A1 * | 3/2003 | Tsukiji | ............... | 280/847 |
| 2006/0284407 A1 | 12/2006 | Iverson et al. | | |
| 2009/0079156 A1 * | 3/2009 | Ichihara | ............... | 280/152.1 |
| 2011/0057410 A1 * | 3/2011 | Eklund et al. | ............... | 280/154 |
| 2012/0038127 A1 * | 2/2012 | Bybee | ............... | 280/152.1 |

* cited by examiner

*Primary Examiner* — John R Olszewski
*Assistant Examiner* — Brodie Follman (57) ABSTRACT

A motorcycle fender extension component for drilless assembly to the leading or trailing end of a motorcycle fender includes a main body structure and a plurality of clamping elements. The main body structure has a top, bottom, front, back and first and second sides with downwardly extending flanges. The main body has a central axis that is arcuate with a radius, width and taper approximately equal to those of the motorcycle fender. At least three orifices are located on the first and second flange and main body. The at least three clamping elements are positioned at the at least three orifices on the first and second flange and on the main body away from the sides. The main body structure of the motorcycle fender extension component may be placed on a motorcycle fender and attached by fastening the clamps to sandwich the motorcycle fender between clamping elements and the main body structure. In other embodiments of the present invention motorcycle fender extension component the motorcycle fender is also included.

20 Claims, 12 Drawing Sheets

MOTORCYCLE FENDER EXTENSION FOR DRILLESS ASSEMBLY

BACKGROUND OF INVENTION a. Field of Invention

The invention relates generally to motorcycle fender extensions for use on the leading or trailing end of a motorcycle fender. More specifically, the present invention relates to a motorcycle fender extension that does not require any welds or physical modifications to a motorcycle fender to attach the motorcycle fender extension.

b. Description of Related Art

The following patents are representative of the field pertaining to the present invention:

United States Patent Application Publication No. 2009/0079156 A1 to Ichihara describes a motorcycle rear fender assembly that includes a rear fender mounted on a vehicle frame structure above a vehicle rear wheel, which fender is divided, in a forward and rearward direction, into three components, including an anterior rear fender subassembly forming a front portion of the rear fender, an intermediate rear fender subassembly forming an intermediate portion of the rear fender, and a posterior rear fender subassembly forming a rear portion of the rear fender.

United States Patent Application Publication No. 2006/0284407 A1 to Iverson et al. describes the drilling of new holes into a vehicle fender fold is avoided by providing a mud flap with a rotating clamping member. A clamping arm of the rotating clamping member is rotated from a disengaged position to an engaged position behind the fender fold, and is then drawn forwardly on the threads of an attachment bolt to clamp the fender fold between the rotating clamping member and a stationary clamping member in-molded into the mud flap. A visual indicator may be provided to show whether the rotating clamping member is behind the vehicle fender fold to which the mud flap is to be attached.

U.S. Pat. No. 4,422,659 to Nebu describes a rear fender structure for a motorcycle having a frame comprises a fender body fixedly attached to the motorcycle frame and a fender member removably joined to the fender body to provide easy access for removal of the rear wheel. The fender body can be hingedly connected to mounting means fixedly supported by the frame such as a tail bracket. The fender body can be removably secured to the tail light bracket.

U.S. Pat. No. 4,169,608 to Logan describes the specification discloses fender extensions which have inner flanges fitting inside and fastening to the inwardly turned flanges of motor vehicle fenders. The inner flanges press edges of outer, cover portions of the extensions tightly against the sides of the fenders. In an alternate embodiment, the inner flange is stepped to provide a shoulder abutting the side of the fender as an aid for proper positioning.

U.S. Pat. No. 3,934,900 to Wilson describes a combined fender and splash guard for a motorcycle comprises a single member injection molded of polypropylene and has a main fender portion and at least on splash guard integrally formed with the fender. The fender and splash guard can be doubled back on itself in a collision or spill without damage. Means are provided to attach the fender and integral splash guard to the motorcycle.

United States Design Pat. No. Des. 293,312 to Stahel illustrates a motorcycle front fender extension. It has planar inside surfaces with no provision or direction for drilless attachment.

Notwithstanding the prior art, the present invention is neither taught nor rendered obvious thereby.

SUMMARY OF INVENTION

The present invention is directed to a motorcycle fender extension component for drilless assembly to either a leading end or trailing end of a motorcycle fender. It includes a main body structure, the main body structure having a top, a bottom, a front, a back, a first side and a second side. Each of the first side and the second side has a downwardly extending flange. The main body structure has at least a portion with a central axis that is arcuate at a radius approximately equal to a radius of a motorcycle fender to which it is attachable and has a width and taper approximately equal to the width and taper of the motorcycle fender to which it is attachable. The main body structure has at least three orifices for receiving clamping elements, one of the at least three orifices is located on the first side flange, one of the at least three orifices is located on the second side flange, and one of the at least three orifices is located on the main body structure away from the sides. A plurality of clamping elements are connected to the main body structure including at least a first clamping element, a second clamping element and a third clamping element. The first clamping element is positioned at the orifice on the first side flange, the second clamping element positioned at the orifice on the second side flange and the third clamping element positioned at the orifice on the main body structure away from the sides. In use, the main body structure of the motorcycle fender extension component may be placed on a motorcycle fender and the clamps may be fastened thereto so as to sandwich the motorcycle fender between the clamping elements and the main body structure. The first clamping component is attached to a first side of the motorcycle fender, the second clamping component is attached to a second side of the motorcycle fender, and the third clamping component is attached to one of a leading end and a trailing end of the motorcycle fender.

In some preferred embodiments of the present invention motorcycle fender extension component for drilless assembly to either a leading end or trailing end of a motorcycle fender the clamping elements each include a threaded receiving nut positioned at a main body structure orifice, a threaded fastener in and through the orifice and a clasp connected to one of the nut and the threaded fastener.

In some preferred embodiments of the present invention motorcycle fender extension component for drilless assembly to either a leading end or trailing end of a motorcycle fender, the clasp has distal claw and is connected to and integral with the nut.

In some preferred embodiments of the present invention motorcycle fender extension component for drilless assembly to either a leading end or trailing end of a motorcycle fender the main body structure further includes at least one recessed stop located on the main body structure to fit adjacent to an end of the motorcycle fender to which is attached, and wherein one of the at least three orifices is located on the recessed stop.

In some preferred embodiments of the present invention motorcycle fender extension component for drilless assembly to either a leading end or trailing end of a motorcycle fender the main body structure side flanges are recessed side flanges to enhance positioning of the motorcycle fender extension component on the motorcycle fender to which it is attachable to render it self-positioning.

In some preferred embodiments of the present invention motorcycle fender extension component for drilless assembly to either a leading end or trailing end of a motorcycle fender the main body structure is symmetrical relative to the central axis.

In some preferred embodiments of the present invention motorcycle fender extension component for drilless assembly to either a leading end or trailing end of a motorcycle fender the main body structure further includes an aerodynamically positioned pair of wings, one of each being located on the first side and the second side of the main body structure.

In some preferred embodiments of the present invention motorcycle fender extension component for drilless assembly to either a leading end or trailing end of a motorcycle fender the pair of wings extends outwardly and upwardly from the main body structure.

In some preferred embodiments of the present invention motorcycle fender extension component for drilless assembly to either a leading end or trailing end of a motorcycle fender the pair of wings has inside surfaces that are flat and form angles of about ten to about seventy five degrees when measured from an imaginary traversing line crossing through the sides of the main body structure at a right angle to the central axis.

In some preferred embodiments of the present invention motorcycle fender extension component for drilless assembly to either a leading end or trailing end of a motorcycle fender the pair of wings has inside surfaces that are flat and form angles of about twenty to about sixty degrees when measured from an imaginary traversing line crossing through the sides of the main body structure at a right angle to the central axis.

In some other preferred embodiments the present invention is directed to in combination, a motorcycle fender and a motorcycle fender extension component for drilless assembly to either a leading end or trailing end of the motorcycle fender. It includes a motorcycle fender having a top, a bottom and a front with a leading edge, a back with a trailing edge, a first side and a second side. It has at least a portion with a central axis that is arcuate at a predetermined radius and a predetermined width and a predetermined taper tapering away from the central axis. The motorcycle fender extension component attaches to one of the leading end and the trailing end of the motorcycle fender. The motorcycle fender extension component includes a main body structure. The main body structure has a top, a bottom, a front, a back, a first side and a second side. Each of the first side and the second side has a downwardly extending flange. The main body structure has at least a portion with a central axis that is arcuate at a radius approximately equal to the radius of the central axis of the motorcycle fender and has a width and taper approximately equal to the width and taper of the motorcycle fender. The main body structure has at least three orifices for receiving clamping elements, one of the at least three orifices located on the first side flange, one the at least three orifices located on the second side flange, and the one of the at least three orifices located on the main body structure away from the sides. A plurality of clamping elements are connected to the main body structure including at least a first clamping element, a second clamping element and a third clamping element, the first clamping element positioned at the orifice on the first side flange, the second clamping element positioned at the orifice on the second side flange and the third clamping element positioned at the orifice on the main body structure away from the sides. In use the main body structure of the motorcycle fender extension component is positioned on the motorcycle fender with the clamps fastened thereto so as to sandwich the motorcycle fender between the clamping elements and the main body structure. The first clamping component is attached to a first side of the motorcycle fender, the second clamping component is attached to a second side of the motorcycle fender, and the third clamping component is attached to one of a leading end and a trailing end of the motorcycle fender.

Additional features, advantages, and embodiments of the invention may be set forth, included or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Referring now in detail to the drawings wherein like reference numerals designate corresponding parts throughout the several views, various embodiments of the present invention are shown.

Figure 1:
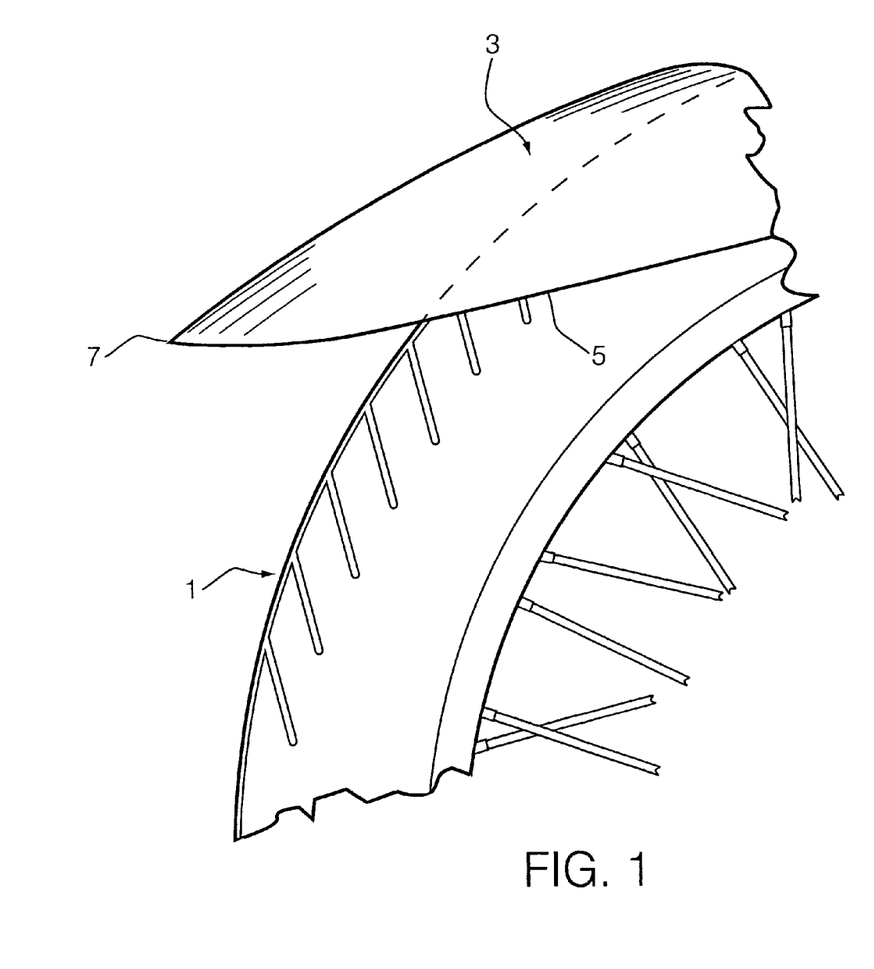
FIG. 1 is a side cut view of the leading edge of a front wheel and fender of a prior art motorcycle.

FIG. 1 is a side cut view of the leading edge 7 of a front wheel 1 and fender 3 or a prior art motorcycle. In this figure the first side 5 of the fender 3 is visible. A second side (not shown) is hidden from view opposite the first side 5 of the fender 3.

Figure 2:
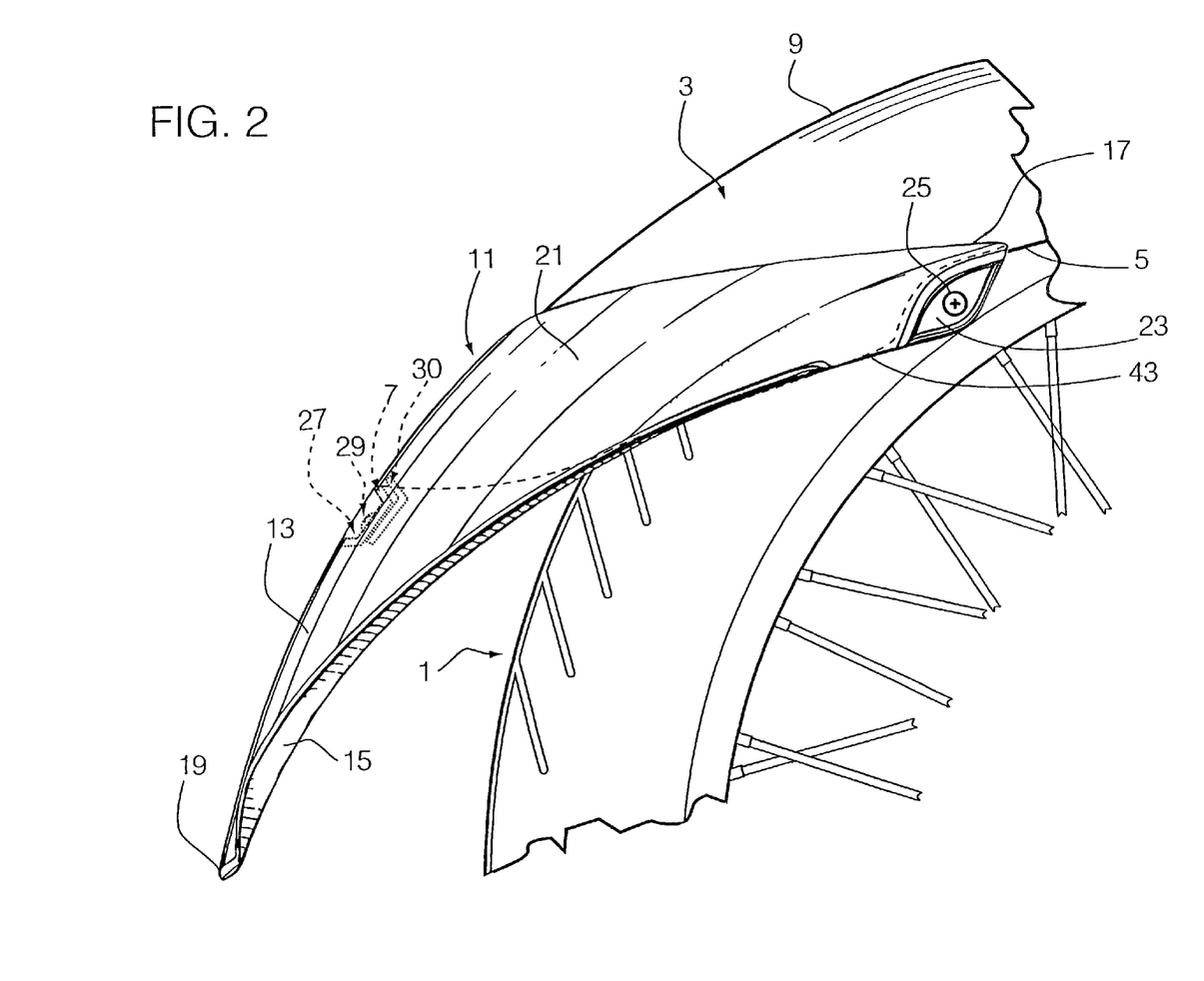
FIG. 2 is a side cut view of the leading edge of a front wheel and fender of a prior art motorcycle as shown in FIG. 1, but with a Motorcycle Fender Extension Component attached to the motorcycle fender.
Figure 3:
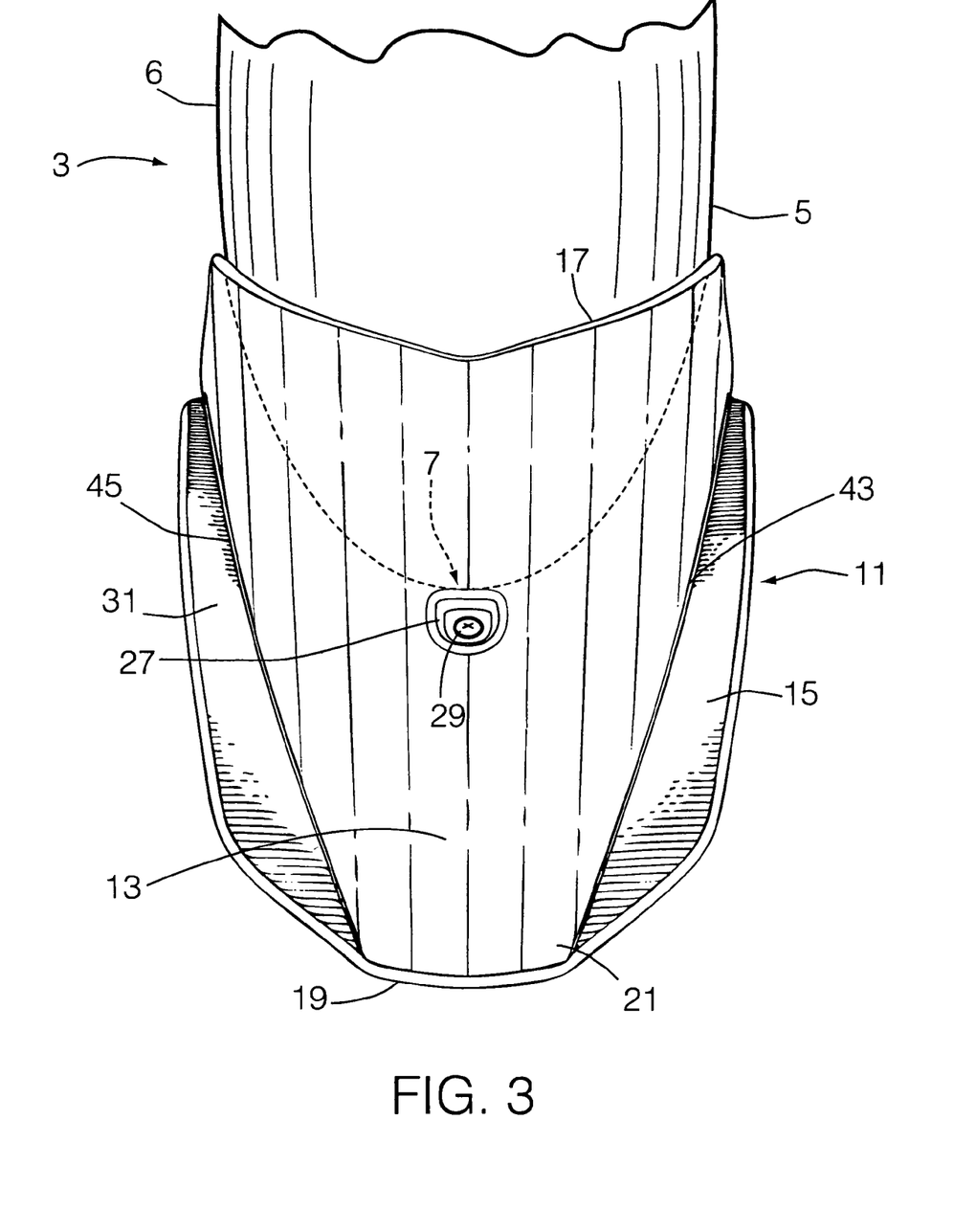
FIG. 3 shows a front partial cut view of the fender and Fender Extension Component of the present invention shown in FIG. 2.
Figure 4:
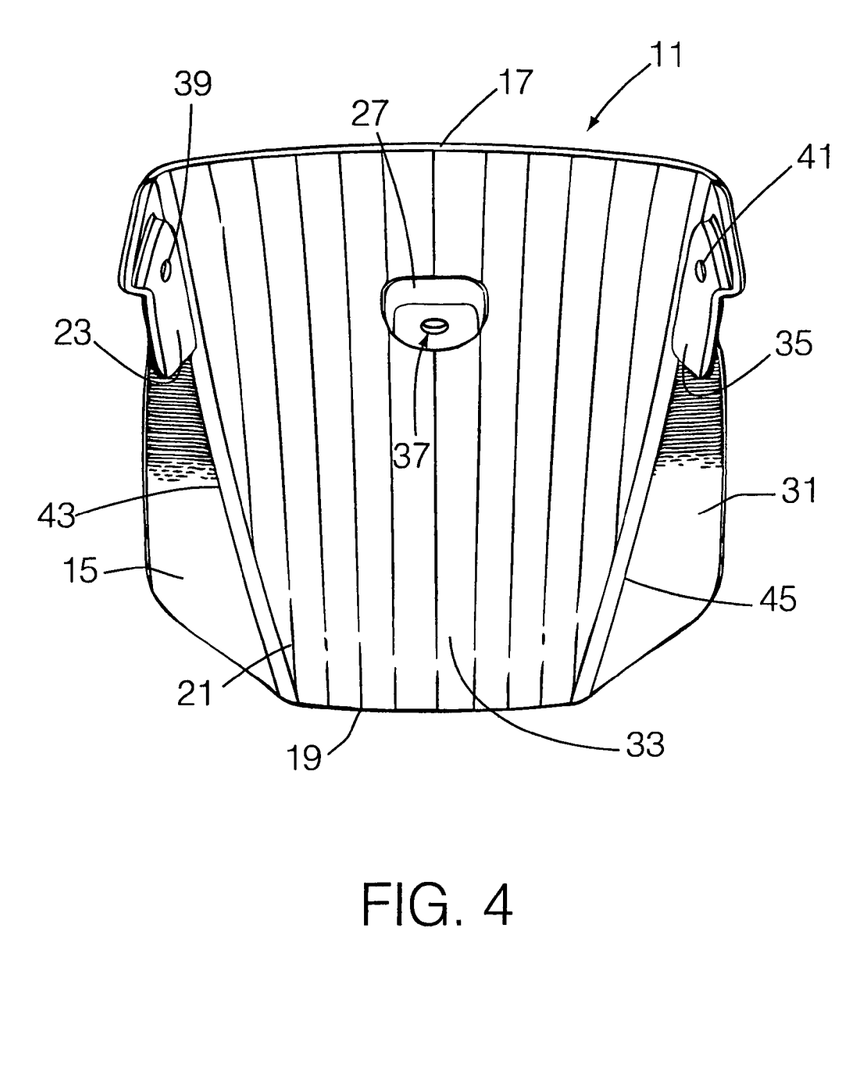
FIG. 4 is a bottom view of the present invention Motorcycle Fender Extension Component shown in FIGS. 2 and 3.
Figure 5:
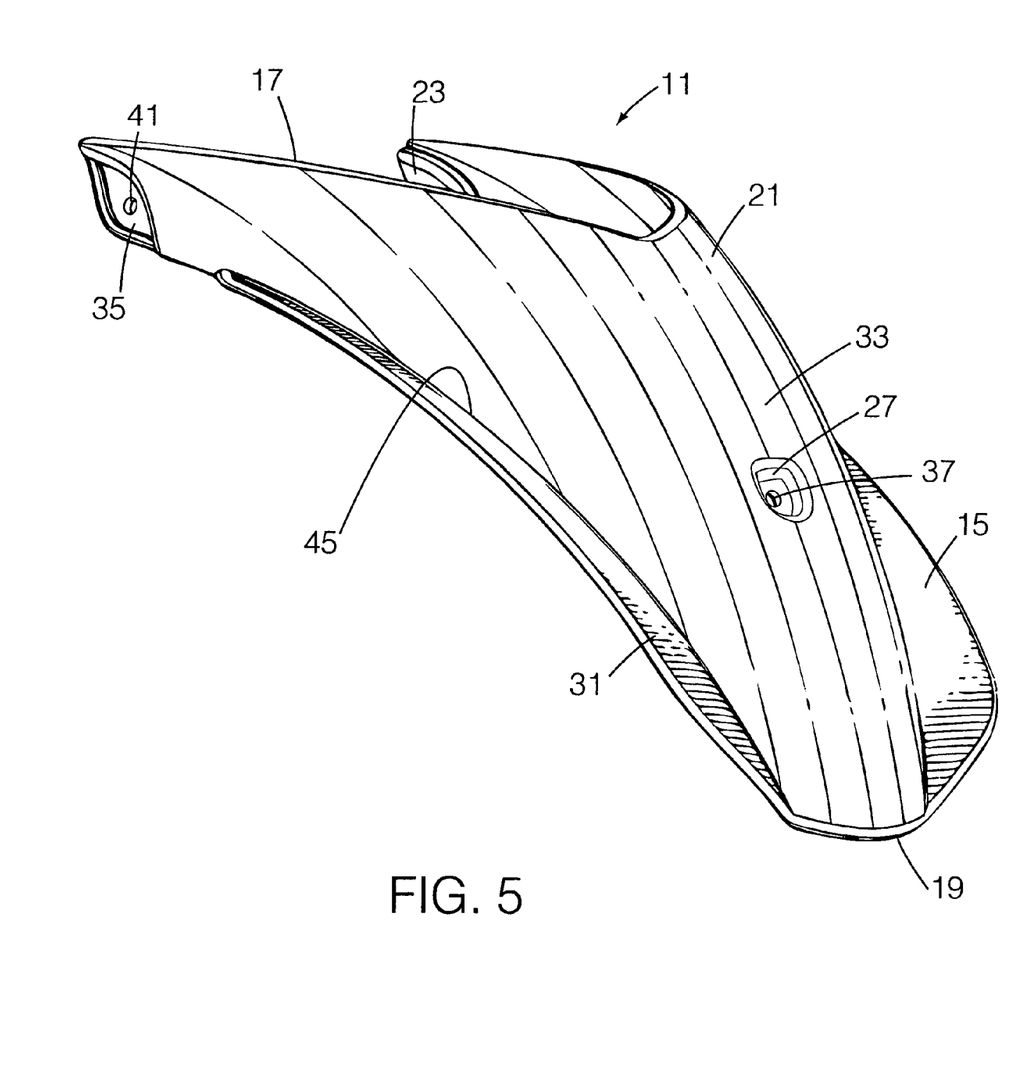
FIG. 5 is a front oblique view of the Motorcycle Fender Extension Component shown in FIGS. 2 through 4.

FIG. 2 is a side cut view of the leading edge 7 of the front wheel 1 and fender 3 of the prior art motorcycle from FIG. 1, but with a motorcycle fender extension component 11 attached to the motorcycle fender 3. FIG. 3 shows a front partial cut view of the fender 3 and fender extension component 11 of the present invention shown in FIG. 2. FIG. 4 is a bottom view of the present invention motorcycle fender extension component 11 shown in FIGS. 2 and 3. FIG. 5 is a front oblique view of the motorcycle fender extension component 11 shown in FIGS. 2 through 4. These four Figures are discussed collectively with the understanding that not all reference numerals are in all Figures.

In the side cut view provided by FIG. 2, the motorcycle fender extension component 11 is attached to the motorcycle fender 3. Motorcycle fender 3 is formed as described in FIG. 1, with the first side 5 of fender 3 partially visible and leading edge 7 hidden by motorcycle fender extension component 11 and shown in dotted outline and the front wheel 1 partially visible. The main body structure 21 of the motorcycle fender extension component 11 has a top 13, a bottom (not shown), a front 19, a back 17, a first side 43 and a second side (not shown) and is symmetric relative to its central axis. The first side 43 has a downwardly extending first flange 23. The second side (not shown) also has a downwardly extending flange (not shown). The central axis of the main body structure 21 is arcuate at a radius approximately equal to the radius of the motorcycle fender 3 to which it is attachable and has a width and taper approximately equal to the width and taper of the motorcycle fender 3 to which it is attachable. The main body structure 21 has at least three orifices (not shown) for receiving clamping elements 25,29, one of the at least three orifices (not shown) is located on the first side flange 23, one of the at least three orifices located on the second side flange (not shown), and one of the at least three orifices (not shown) is located on the main body structure 21 away from the side 43.

A plurality of clamping elements 25, 29 are connected to the main body structure 21 including at least a first clamping element 25 positioned at the orifice (not shown) on the first side flange 23, a second clamping element (not shown) positioned at the orifice on the second side flange (not shown) and a third clamping element 29 positioned at the orifice (not shown) on the main body structure 21 away from the side 43.

The main body structure 21 of the motorcycle fender extension component 11 may be placed on the top 9 of the motorcycle fender 3 to which it is attachable and the clasps 30 may be fastened thereto so as to sandwich the motorcycle fender 3 between the clamping elements 25, 29 and the main body structure 21 and wherein the first clamping component 25 is attached to a first side 5 of the motorcycle fender 3, the second clamping component (no shown) is attached to a second side (not shown) of the motorcycle fender 3, and the third clamping component 29 is attached to a leading edge 7 of the motorcycle fender 3. In other preferred embodiments of the present invention, the third clamping component 29 may be attached to a trailing edge (not shown) of the motorcycle fender 3. The advantage of this design over prior art is that the motorcycle fender extension component 11 attaches to the fender 3 without any welds or physical modifications to the fender.

The clamping components 25, 29 of the present invention motorcycle fender extension component 11 for drilless assembly include a threaded fastener, the head of which is visible on clamping component 25. This threaded fastener is designed to fit through one of the orifices (not shown). In the present embodiment of the present invention motorcycle fender extension component 11, the clamping components 25, 29 also have a nut and clasp 30 that are formed as one integral piece. In other embodiments of the present invention motorcycle fender extension component 11, the clamping components 25, 29 may be formed in other manners, such as having the threaded fastener, nut and clasp as three distinct pieces, or having the clasp and threaded fastener formed as one piece and the nut as a second piece. As seen in FIG. 2, the single body nut and clasp 30 has a distal claw to aid in securing the motorcycle fender extension component 11 to the leading edge 7 of the motorcycle fender 3.

The main body structure 21 of the motorcycle fender extension component 11 further includes at least one recessed stop 27 located on the main body structure 21 to fit adjacent to the leading edge 7 of the motorcycle fender 3. One of the at least three orifices (not shown) is located on the recessed stop 27.

In the present embodiment of the motorcycle fender extension component 11, the first side flange 23 is a recessed side flange to enhance positioning of the motorcycle fender extension component 11 on the fender 3, rendering it self-positioning. A pair of aerodynamically positioned wings 15 is located on the first side 43 and second side (not shown) of the main body structure 21 of the motorcycle fender extension component 11.

The front partial cut view provided by FIG. 3 provides additional perspective of the parts of the present invention motorcycle fender extension component 11 as described above in FIG. 2. The main body structure 21 of the motorcycle fender extension component 11 has a top 13, a bottom (not shown), a front 19, a back 17, a first side 43 and a second side 45 and is symmetric relative to its central axis. The clamping element 29 is connected to the main body structure 21 and positioned at the orifice (not shown) on the main body structure 21 away from the side 43.

The main body structure 21 of the motorcycle fender extension component 11 may be placed on the motorcycle fender 3 to which it is attachable and the clasps 30 may be fastened thereto so as to sandwich the motorcycle fender 3 between the clamping elements 29 and the main body structure 21 and wherein the first clamping component (not shown) is attached to a first side 5 of the motorcycle fender 3, the second clamping component (not shown) is attached to a second side 6 of the motorcycle fender 3, and the third clamping component 29 is attached to a leading edge 7 of the motorcycle fender 3. In other preferred embodiments of the present invention, the third clamping component 29 may be attached to a trailing edge (not shown) of the motorcycle fender 3.

The clamping component 29 of the present invention motorcycle fender extension component 11 for drilless assembly include a threaded fastener, the head of which is visible on clamping component 29. This threaded fastener is designed to fit through one of the orifices (not shown). In the present embodiment of the motorcycle fender extension component 11, the clamping components 29 are formed as described above in FIG. 2.

The main body structure 21 of the motorcycle fender extension component 11 further includes at least one recessed stop 27 located on the main body structure 21 to fit adjacent to the leading edge 7 of the motorcycle fender 3. One of the at least three orifices (not shown) is located on the recessed stop 27.

A pair of aerodynamically positioned wings 15, 31 is located on the first side 43 and second side 45 of the main body structure 21 of the motorcycle fender extension component 11. The pair of wings 15, 31 extend outwardly and upwardly from the main body structure 21 The inside surface of wings 15 and 31 are flat and form an angle of about ten to seventy five degrees or about twenty to sixty degrees when measured from an imaginary traversing line crossing through the sides 43, 45 of the main body structure 21 at a right angle to the central axis.

FIG. 4 provides a bottom view of the present invention motorcycle fender extension component 11 from FIGS. 2 and 3. The main body structure 21 of the motorcycle fender extension component 11 has a top (not shown), a bottom 33, a front 19, a back 17, a first side 43 and a second side 45 and is symmetric relative to its central axis. The first side 43 has a downwardly extending recessed flange 23 and the second side 45 also has a downwardly extending recessed flange 35.

The main body structure 21 has at least three orifices 37, 39, 41 for receiving clamping elements (not shown). One of the at least three orifices 39 is located on the first recessed flange 23, one of the at least three orifices 41 located on the second side flange 35, and one of the at least three orifices 37 is located on the main body structure 21 away from the sides 43 and 45 on recessed stop 27.

As described in FIG. 3, a pair of aerodynamically positioned wings 15, 31 are located on the first side 43 and second side 45 of the main body structure 21 of the motorcycle fender extension component 11. The pair of wings 15, 31 extend outwardly and upwardly from the main body structure 21 The inside surface of wings 15 and 31 are flat and form an angle of about ten to seventy five degrees or about twenty to sixty degrees when measured from an imaginary traversing line crossing through the sides 43, 45 of the main body structure 21 at a right angle to the central axis.

FIG. 5 is a front oblique view of the motorcycle fender extension component 11 described above in FIGS. 2 through 4. The main body structure 21 of the motorcycle fender extension component 11 has a top 13, a bottom (not shown), a front 19, a back 17, a first side (not shown) and a second side 45 and is symmetric relative to its central axis. The first side (not shown) has a downwardly extending recessed flange 23 and the second side 45 also has a downwardly extending recessed flange 35.

The main body structure 21 has at least three orifices 37, 41 for receiving clamping elements (not shown). One of the at least three orifices (not shown) is located on the first recessed flange 23, one of the at least three orifices 41 located on the second side flange 35, and one of the at least three orifices 37 is located on the main body structure 21 away from the sides 43 and 45 on recessed stop 27.

As described in FIG. 3, a pair of aerodynamically positioned wings 15, 31 are located on the first side 43 and second side 45 of the main body structure 21 of the motorcycle fender extension component 11. The pair of wings 15, 31 extend outwardly and upwardly from the main body structure 21 The inside surface of wings 15 and 31 are flat and form an angle of about ten to seventy five degrees or about twenty to sixty degrees when measured from an imaginary traversing line crossing through the sides 43, 45 of the main body structure 21 at a right angle to the central axis.

Figure 6:
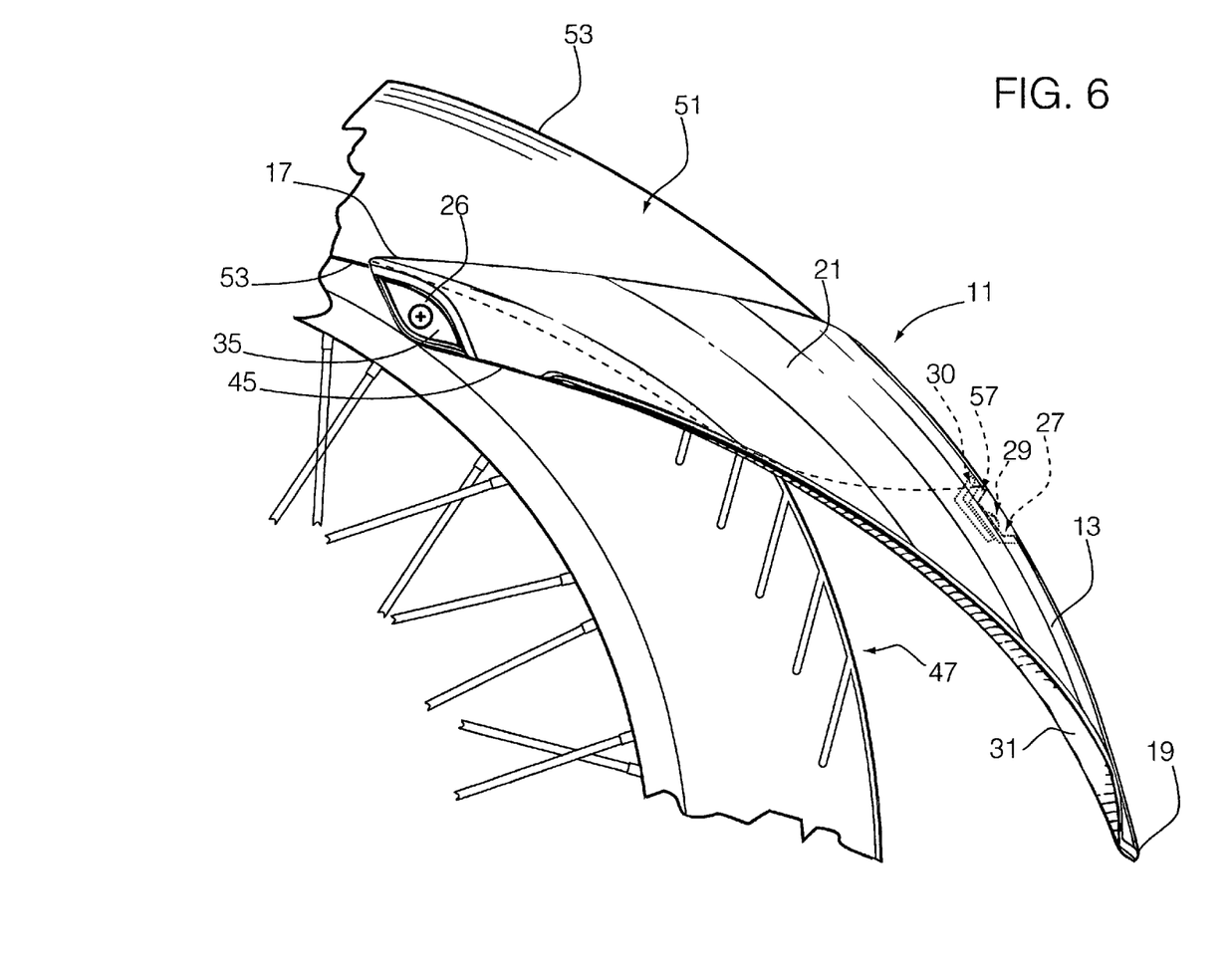
FIG. 6 shows a present invention Motorcycle Fender Extension Component on the trailing edge of a rear wheel of a motorcycle.

FIG. 6 shows a present invention motorcycle fender extension component 11 on a trailing edge 57 of a rear wheel 47 of a motorcycle. Motorcycle extension component 11 is the same as described above in FIG. 2 with the first side 53 of fender 51 partially visible and trailing edge 57 hidden by motorcycle fender extension component 11 and shown in dotted outline and the rear wheel 47 partially visible. The main body structure 21 of the motorcycle fender extension component 11 has a top 13, a bottom (not shown), a front 19, a back 17, a first side (not shown) and a second side 45 and is symmetric relative to its central axis. The second side 45 has a downwardly extending first flange 35. The first side (not shown) also has a downwardly extending flange (not shown). The central axis of the main body structure 21 is arcuate at a radius approximately equal to the radius of the motorcycle fender 51 to which it is attachable and has a width and taper approximately equal to the width and taper of the motorcycle fender 51 to which it is attachable. The main body structure 21 has at least three orifices (not shown) for receiving clamping elements 26,29, one of the at least three orifices (not shown) is located on the first side flange (not shown), one of the at least three orifices located on the second side flange 35 and one of the at least three orifices (not shown) is located on the main body structure 21 away from the side 45.

A plurality of clamping elements 26, 29 are connected to the main body structure 21 including at least a first clamping element (not shown) positioned at the orifice (not shown) on the first side flange (not shown), a second clamping element 26 positioned at the orifice on the second side flange 35 and a third clamping element 29 positioned at the orifice (not shown) on the main body structure 21 away from the side 45.

The main body structure 21 of the motorcycle fender extension component 11 may be placed on the top 55 of the motorcycle fender 51 to which it is attachable and the clasp 30 may be fastened thereto so as to sandwich the motorcycle fender 51 between the clamping elements 26, 29 and the main body structure 21 and wherein the first clamping component (not shown) is attached to a first side (not shown) of the motorcycle fender 51, the second clamping component 26 is attached to a second side 53 of the motorcycle fender 51, and the third clamping component 29 is attached to a trailing edge 57 of the motorcycle fender 51. The advantage of this design over prior art is that the motorcycle fender extension component 11 attaches to the fender 51 without any welds or physical modifications to the fender.

The clamping components 26, 29 of the present invention motorcycle fender extension component 11 for drilless assembly include a threaded fastener, the head of which is visible on clamping component 26. This threaded fastener is designed to fit through one of the orifices (not shown). In the present embodiment of the present invention motorcycle fender extension component 11, the clamping components 26, 29 also have a nut and clasp 30 that are formed as one integral piece. In other embodiments of the present invention motorcycle fender extension component 11, the clamping components 26, 29 may be formed in other manners, such as having the threaded fastener, nut and clasp as three distinct pieces, or having the clasp and threaded fastener formed as one piece and the nut as a second piece. As seen in FIG. 2, the single body nut and clasp 30 has a distal claw to aid in securing the motorcycle fender extension component 11 to the trailing edge 57 of the motorcycle fender 51.

The main body structure 21 of the motorcycle fender extension component 11 further includes at least one recessed stop 27 located on the main body structure 21 to fit adjacent to the trailing edge 57 of the motorcycle fender 51. One of the at least three orifices (not shown) is located on the recessed stop 27.

In the present embodiment of the motorcycle fender extension component 11, the second side flange 35 is a recessed side flange to enhance positioning of the motorcycle fender extension component 11 on the fender 51, rendering it self-positioning. A pair of aerodynamically positioned wings 31 is located on the first side (not shown) and second side 45 of the main body structure 21 of the motorcycle fender extension component 11.

Figure 7:
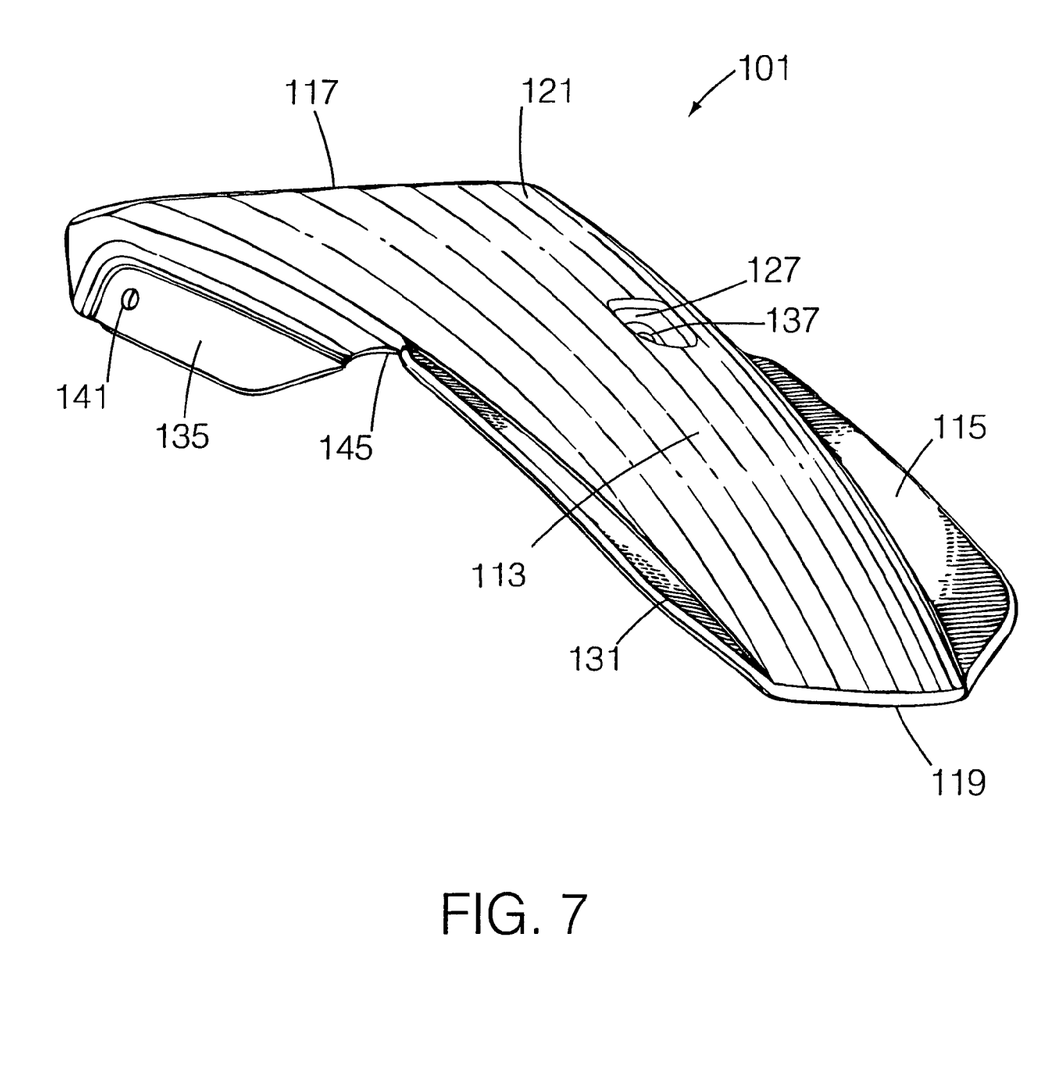
FIG. 7 is a front oblique view of an alternative embodiment present invention Motorcycle Fender Extension Component.

FIG. 7 is a front oblique view of another embodiment of the present invention motorcycle fender extension component 101. The main body structure 121 of the motorcycle fender extension component 101 has a top 113), a bottom (not shown), a front 119, a back 117, a first side (not shown) and a second side 145 and is symmetric relative to its central axis. The first side (not shown) has a downwardly extending recessed flange (not shown) and the second side 145 also has a downwardly extending recessed flange 135.

The main body structure 121 has at least three orifices 137, 141 for receiving clamping elements (not shown). One of the at least three orifices (not shown) is located on the first recessed flange (not shown), one of the at least three orifices 141 located on the second side recessed flange 135, and one of the at least three orifices 137 is located on the main body structure 121 on recessed stop 127.

A pair of aerodynamically positioned wings 115, 131 are located on the first side (not shown) and second side 145 of the main body structure 121 of the motorcycle fender extension component 101. The pair of wings 115, 131 extend outwardly and upwardly from the main body structure 121 The inside surface of wings 115 and 131 are flat and form an angle of about ten to seventy five degrees or about twenty to sixty degrees when measured from an imaginary traversing line crossing through the sides 143, 145 of the main body structure 121 at a right angle to the central axis.

The clamping elements (not shown) as described in FIG. 2 above would be connected to the main body structure 121 and may be positioned at the orifices 137, 141 on the main body structure 121.

Figure 8:
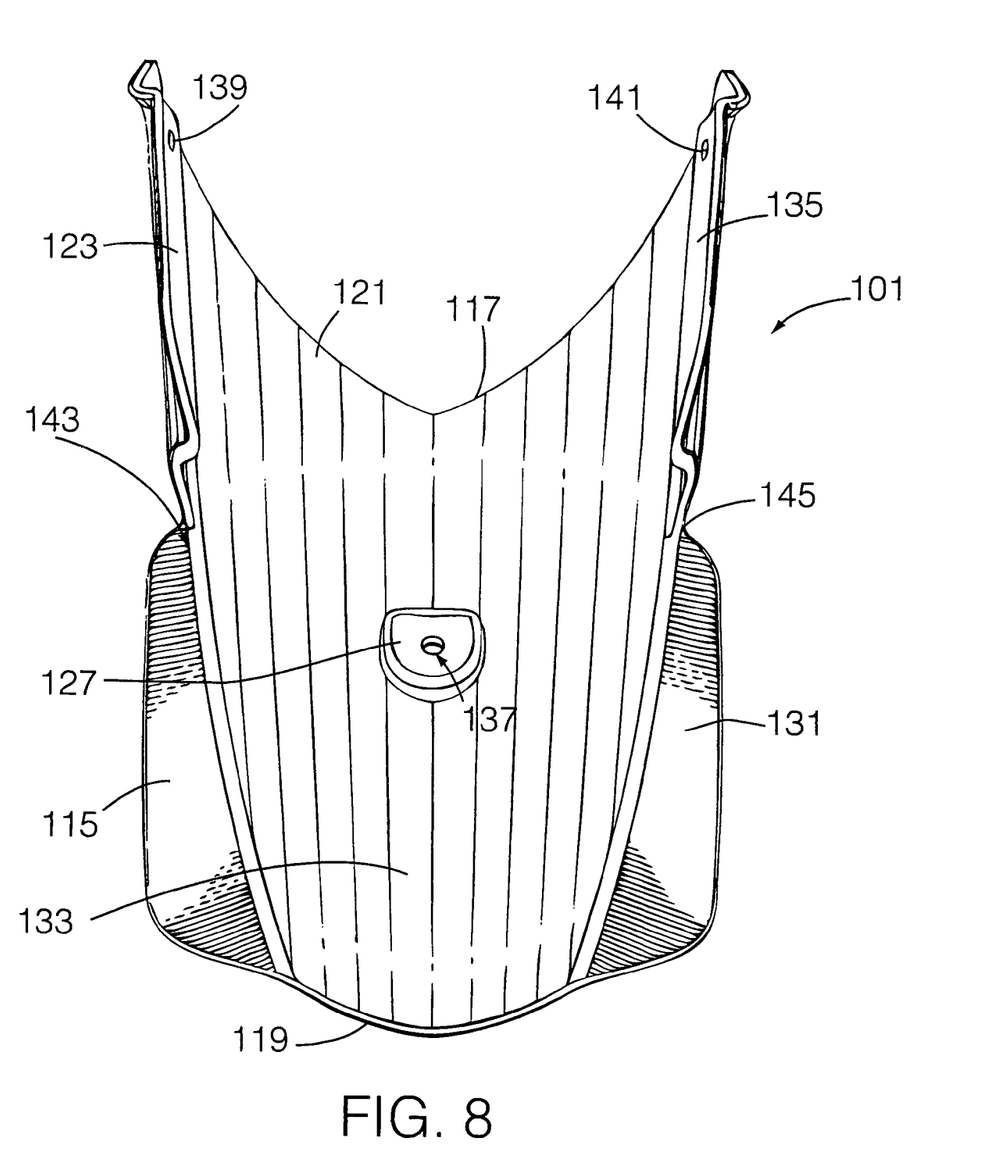
FIG. 8 is a bottom view of the present invention Motorcycle Fender Extension Component shown in FIG. 7.

FIG. 8 provides a bottom view of the present invention motorcycle fender extension component 101 from FIG. 7. The main body structure 121 of the motorcycle fender extension component 101 has a top (not shown), a bottom 133, a front 119, a back 117, a first side 143 and a second side 145 and is symmetric relative to its central axis. The first side 143 has a downwardly extending recessed flange 123 and the second side 145 also has a downwardly extending recessed flange 135.

The main body structure 121 has at least three orifices 137, 139, 141 for receiving clamping elements (not shown) as described above in FIG. 2. One of the at least three orifices 139 is located on the first recessed flange 123, one of the at least three orifices 141 located on the second side recessed flange 135, and one of the at least three orifices 137 is located on the main body structure 121 away from the sides 143 and 145 on recessed stop 127.

A pair of aerodynamically positioned wings 115, 131 are located on the first side 143 and second side 145 of the main body structure 121 of the motorcycle fender extension component 101. The pair of wings 115, 131 extend outwardly and upwardly from the main body structure 121 The inside surface of wings 115 and 131 are flat and form an angle of about ten to seventy five degrees or about twenty to sixty degrees when measured from an imaginary traversing line crossing through the sides 143, 145 of the main body structure 121 at a right angle to the central axis.

Figure 9:
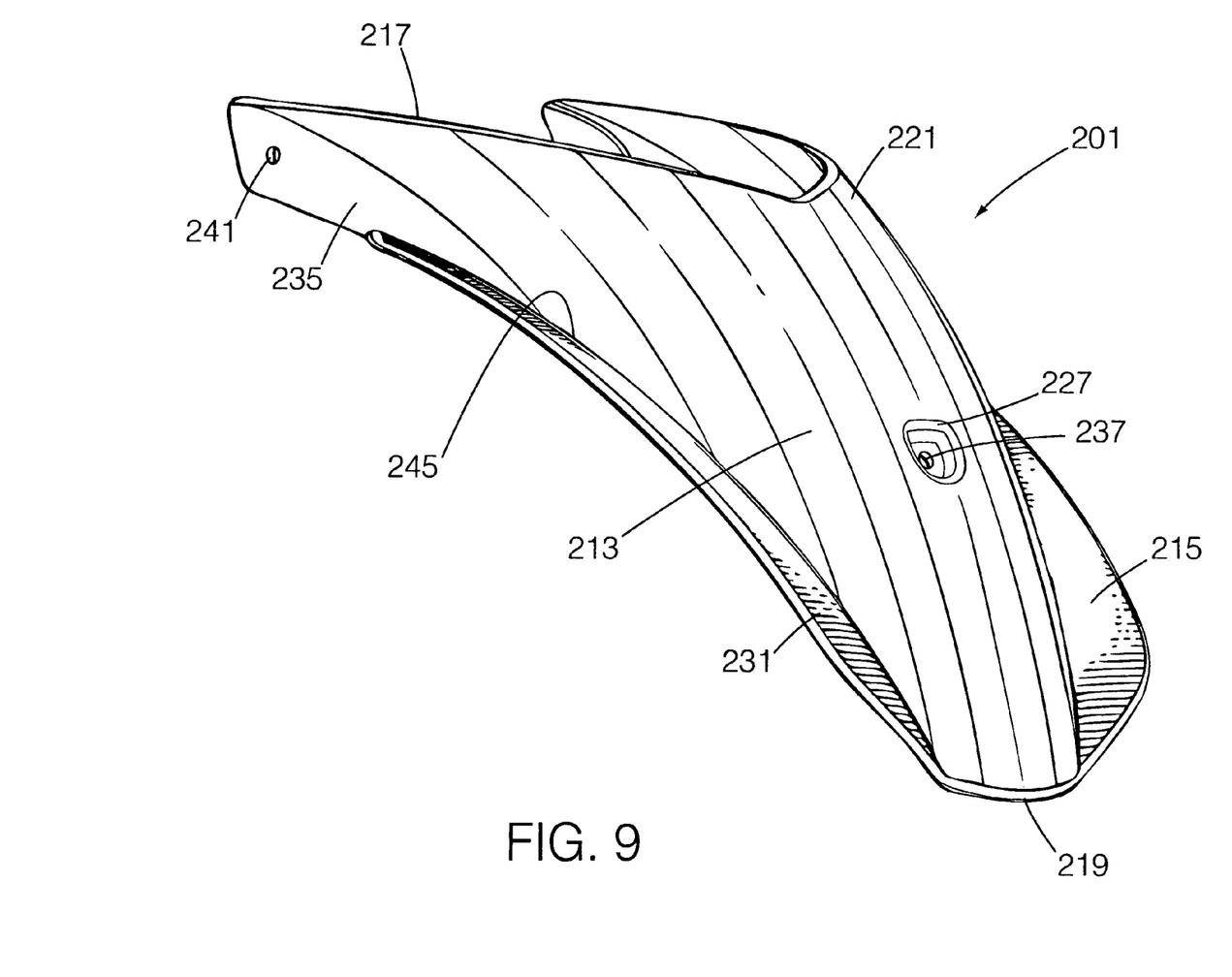
FIG. 9 is yet another embodiment of an alternative embodiment present invention Motorcycle Fender Extension Component.

FIG. 9 is a front oblique view of another embodiment of the present invention motorcycle fender extension component 201. The main body structure 221 of the motorcycle fender extension component 201 has a top 213), a bottom (not shown), a front 219, a back 217, a first side (not shown) and a second side 245 and is symmetric relative to its central axis. The first side (not shown) has a downwardly extending flange (not shown) and the second side 245 also has a downwardly extending flange 235. Unlike previous embodiments of the present invention motorcycle fender extension component, the flanges 235 are not recessed.

The main body structure 221 has at least three orifices 237, 241 for receiving clamping elements (not shown). One of the at least three orifices (not shown) is located on the first flange (not shown), one of the at least three orifices 241 located on the second flange 235, and one of the at least three orifices 237 is located on the main body structure 221 on recessed stop 227.

A pair of aerodynamically positioned wings 215, 231 are located on the first side (not shown) and second side 245 of the main body structure 221 of the motorcycle fender extension component 201. The pair of wings 215, 231 extend outwardly and upwardly from the main body structure 221 The inside surface of wings 215 and 231 are flat and form an angle of about ten to seventy five degrees or about twenty to sixty degrees when measured from an imaginary traversing line crossing through the sides 243, 245 of the main body structure 221 at a right angle to the central axis.

The clamping elements (not shown) as described in FIG. 2 above would be connected to the main body structure 221 and may be positioned at the orifices 237, 241 on the main body structure 221.

Figure 10:
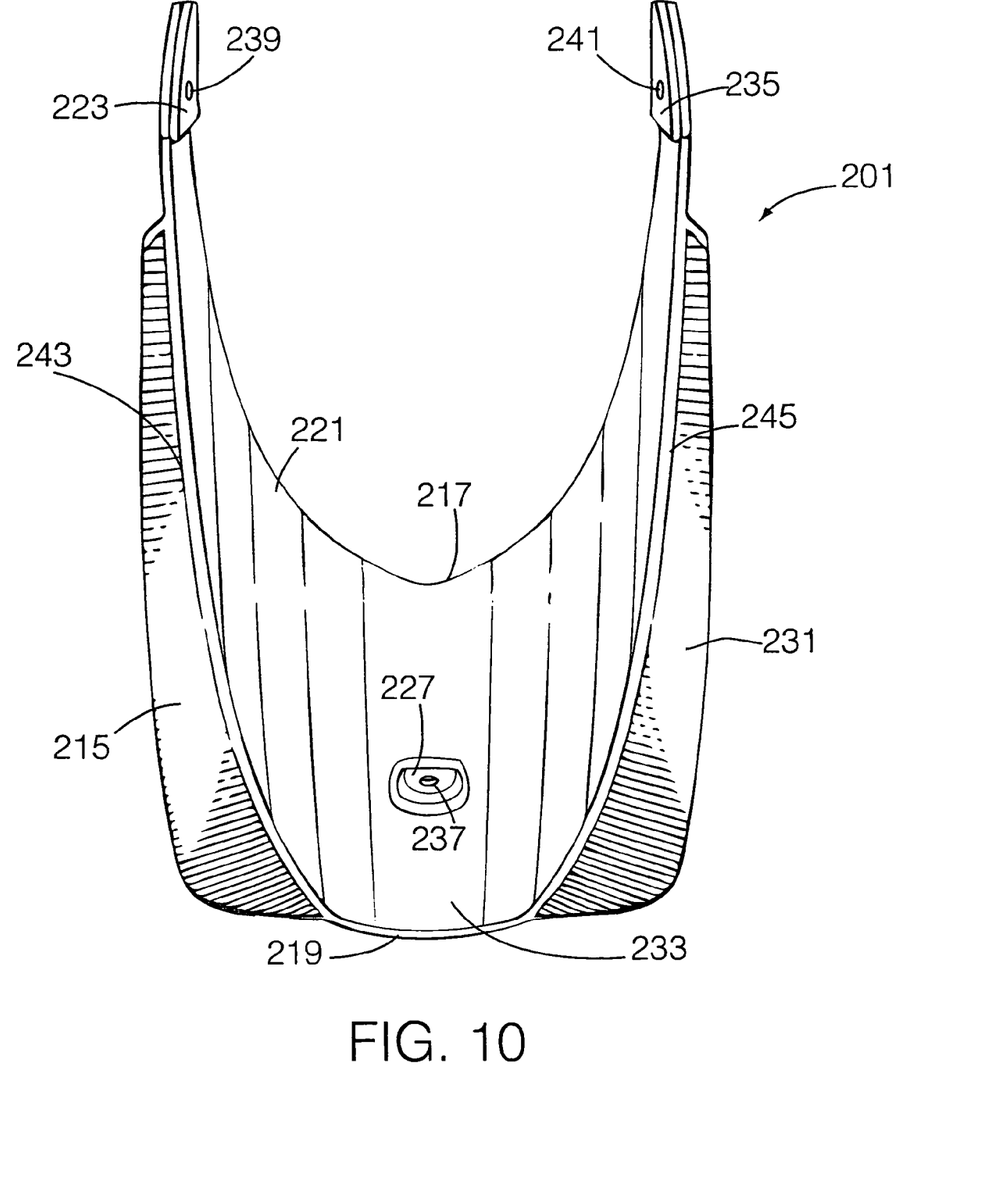
FIG. 10 is a bottom view of the present invention Motorcycle Fender Extension Component shown in FIG. 9.

FIG. 10 provides a bottom view of the present invention motorcycle fender extension component 201 from FIG. 9. The main body structure 221 of the motorcycle fender extension component 201 has a top (not shown), a bottom 233, a front 219, a back 217, a first side 243 and a second side 245 and is symmetric relative to its central axis. The first side 243 has a downwardly extending flange 223 and the second side 245 also has a downwardly extending flange 235. Since the flanges 223 and 235 are not recessed as in other embodiments, they feature profiled spacing pads to enhance the positioning and fit of the motorcycle fender extension component 201 on a fender (not shown).

The main body structure 221 has at least three orifices 237, 239, 241 for receiving clamping elements (not shown) as described above in FIG. 2. One of the at least three orifices 239 is located on the first flange 223, one of the at least three orifices 241 located on the second side flange 235, and one of the at least three orifices 237 is located on the main body structure 221 away from the sides 243 and 245 on recessed stop 227.

A pair of aerodynamically positioned wings 215, 231 are located on the first side 243 and second side 245 of the main body structure 221 of the motorcycle fender extension component 201. The pair of wings 215, 231 extend outwardly and upwardly from the main body structure 221 The inside surface of wings 215 and 231 are flat and form an angle of about ten to seventy five degrees or about twenty to sixty degrees when measured from an imaginary traversing line crossing through the sides 243, 245 of the main body structure 221 at a right angle to the central axis.

Figure 11:
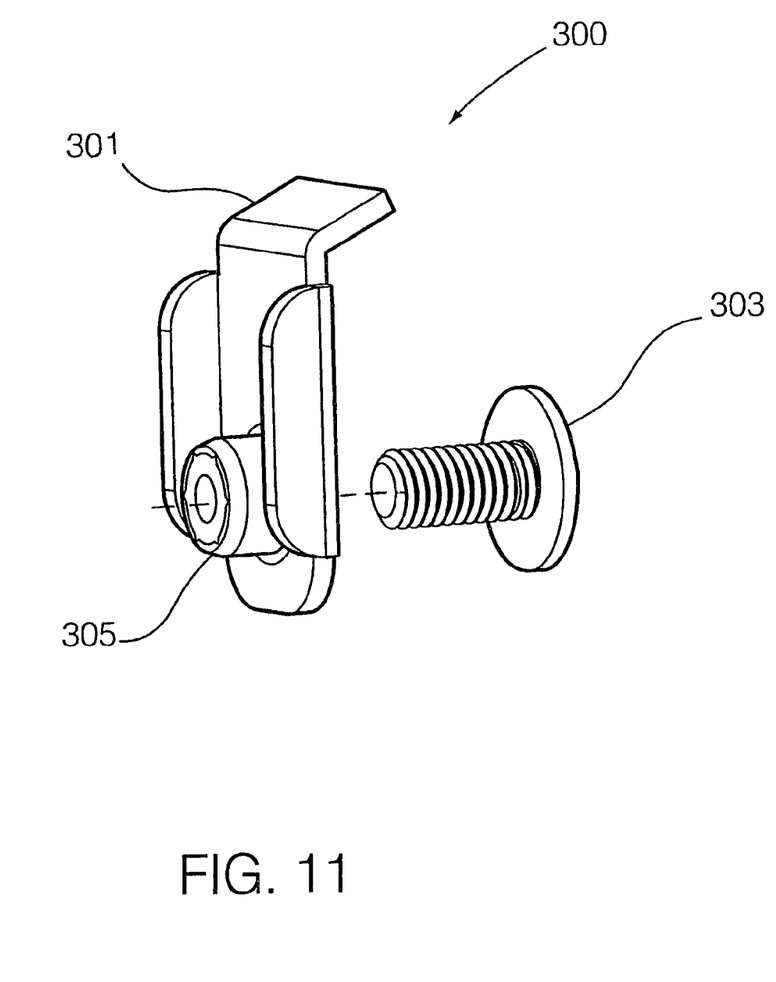
FIG. 11 is a perspective side view of a clamping element used in present invention Motorcycle Fender Extension Component in an unconnected state.
Figure 12:
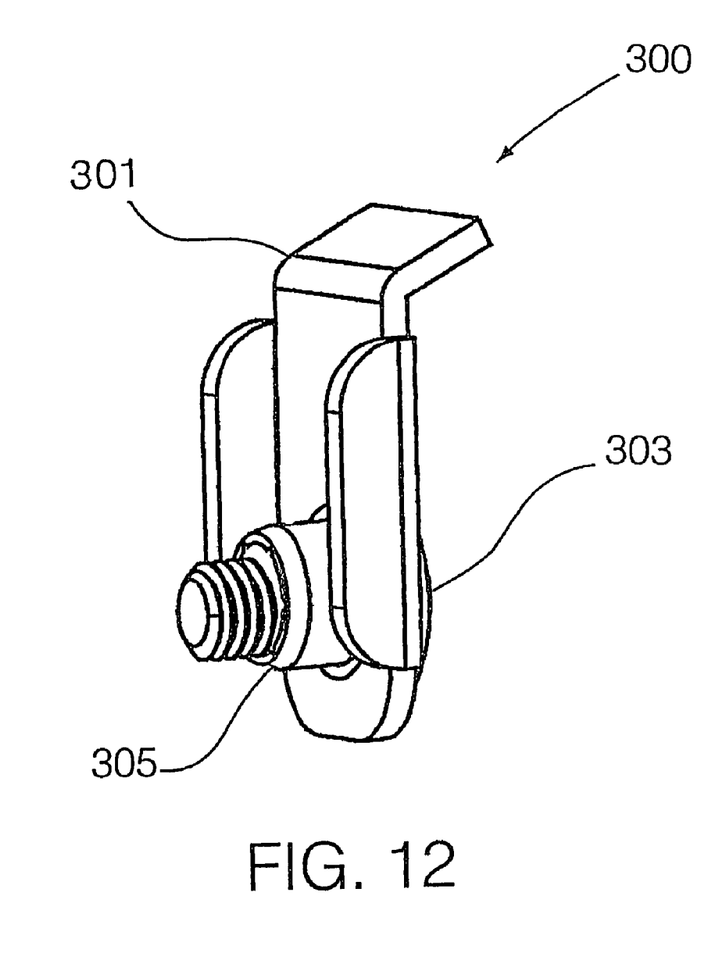
FIG. 12 is a perspective side view of a clamping element shown in FIG. 11 in a fully connected state.

FIG. 11 is a perspective side view of the clamping element 300 used as components in the present invention in an unconnected state and FIG. 12 is a perspective side view of the clamping element 300 of FIG. 11 in a fully connected state. These two Figures are discussed collectively with the understanding that not all reference numerals are in all Figures. The clamping element 300 is attached to the main body structure (not shown) as described above and includes a threaded receiving nut 305, a threaded fastener 303 and a clasp 301. In some embodiments of the present invention, the clasp 301 may have a distal claw to aid in securing the present invention motorcycle fender extension component to a fender. In some embodiments, two of the three components are fixedly connected to one another, such as having the clasp 301 and threaded receiving nut 305 welded as one piece. In other preferred embodiments all three components of the clamping element 300 are moveable relative to one another. In yet other preferred embodiments of the clamping element 300 all three components are moveable relative to one another with two of the three components being seatable. For example, the clasp 301 may have a recessed area adapted to fit a matching threaded receiving nut 305 such that when the threaded receiving nut 305 is seated inside the clasp 301 the two components act as a single fixed piece. It is to be understood that the above examples are intended to illustrate possible configurations of the clamping element 300 and in no way limit the clamping element configuration.

In some other preferred embodiments of the present invention motorcycle fender extension component, the wings described in the above paragraphs are not aerodynamically designed. The wings may continue the shape of the underlying fender in some preferred embodiments, or may take on another shape that is not necessarily aerodynamically shaped. In yet other embodiments, the wings are completely eliminated from the present invention motorcycle fender extension component.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A motorcycle fender extension component for drilless assembly to either a leading end or trailing end of a motorcycle fender, which comprises:
   a) a main body structure, said main body structure having a top, a bottom, a front, a back, a first side and a second side, each of said first side and said second side having a downwardly extending flange, said main body structure having at least a portion with a central axis that is arcuate at a radius approximately equal to a radius of a motorcycle fender to which it is attachable and has a width and taper approximately equal to the width and taper of said motorcycle fender to which it is attachable, said main body structure having at least three orifices for receiving clamping elements, one of said at least three orifices located on said first side flange, one of said at least three orifices located on said second side flange, and one of said at least three orifices located on said main body structure away from said sides;
   b) a plurality of clamping elements connected to said main body structure including at least a first clamping element, a second clamping element and a third clamping element, said first clamping element positioned at said orifice on said first side flange, said second clamping element positioned at said orifice on said second side flange and said third clamping element positioned at said orifice on said main body structure away from said sides;
   wherein said main body structure of said motorcycle fender extension component may be placed on said motorcycle fender to which it is attachable and said clamps may be fastened thereto so as to sandwich said motorcycle fender to which it is attachable between said clamping elements and said main body structure and wherein said first clamping component is attached to a first side of said motorcycle fender, said second clamping component is attached to a second side of said motorcycle fender, and said third clamping component is attached to one of a leading end and a trailing end of said motorcycle fender.

2. The motorcycle fender extension component for drilless assembly to either a leading end or trailing end of a motorcycle fender of claim 1 wherein said clamping elements each include a threaded receiving nut positioned at a main body structure orifice, a threaded fastener in and through said orifice and a clasp connected to one of said nut and said threaded fastener.

3. The motorcycle fender extension component for drilless assembly to either a leading end or trailing end of a motorcycle fender of claim 2 wherein said clasp has distal claw and is connected to and integral with said nut.

4. The motorcycle fender extension component for drilless assembly to either a leading end or trailing end of a motorcycle fender of claim 1 wherein said main body structure further includes at least one recessed stop located on said main body structure to fit adjacent to an end of said motorcycle fender to which is attached, and wherein one of said at least three orifices is located on said recessed stop.

5. The motorcycle fender extension component for drilless assembly to either a leading end or trailing end of a motorcycle fender of claim 1 wherein said main body structure side flanges are recessed side flanges to enhance positioning of said motorcycle fender extension component on said motorcycle fender to which it is attachable to render it self-positioning.

6. The motorcycle fender extension component for drilless assembly to either a leading end or trailing end of a motorcycle fender of claim 1 wherein said main body structure is symmetrical relative to said central axis.

7. The motorcycle fender extension component for drilless assembly to either a leading end or trailing end of a motorcycle fender of claim 1 wherein said main body structure further includes an aerodynamically positioned pair of wings, one of each being located on said first side and said second side of said main body structure.

8. The motorcycle fender extension component for drilless assembly to either a leading end or trailing end of a motorcycle fender of claim 6 wherein each of said pair of wings extends outwardly and upwardly from said main body structure.

9. The motorcycle fender extension component for drilless assembly to either a leading end or trailing end of a motorcycle fender of claim 8 wherein each of said pair of wings has inside surfaces that are flat and form angles of about ten to about seventy five degrees when measured from an imaginary traversing line crossing through said sides of said main body structure at a right angle to said central axis.

10. The motorcycle fender extension component for drilless assembly to either a leading end or trailing end of a motorcycle fender of claim 1 wherein each of said pair of wings has inside surfaces that are flat and form angles of about twenty to about sixty degrees when measured from an imaginary traversing line crossing through said sides of said main body structure at a right angle to said central axis.

11. In combination, a motorcycle fender and a motorcycle fender extension component for drilless assembly to either a leading end or trailing end of said motorcycle fender, which comprises:
   A) a motorcycle fender having a top, a bottom, a front with a leading edge, a back with a trailing edge, a first side and a second side, and having at least a portion with a central axis that is arcuate at a predetermined radius, a predetermined width and a predetermined taper tapering away from said central axis;
   B) a motorcycle fender extension component attached to one of said leading end and said trailing end of said motorcycle fender, said motorcycle fender extension component including:
      a) a main body structure, said main body structure having a top, a bottom, a front, a back, a first side and a second side, each of said first side and said second side having a downwardly extending flange, said main body structure having at least a portion with a central axis that is arcuate at a radius approximately equal to said radius of said central axis of said motorcycle fender and has a width and taper approximately equal to the width and taper of said motorcycle fender, said main body structure having at least three orifices for receiving clamping elements, one of said at least three orifices located on said first side flange, one said at least three orifices located on said second side flange, and said one of said at least three orifices located on said main body structure away from said sides;

b) a plurality of clamping elements connected to said main body structure including at least a first clamping element, a second clamping element and a third clamping element, said first clamping element positioned at said orifice on said first side flange, said second clamping element positioned at said orifice on said second side flange and said third clamping element positioned at said orifice on said main body structure away from said sides;

wherein said main body structure of said motorcycle fender extension component is positioned on said motorcycle fender with said clamps fastened thereto so as to sandwich said motorcycle fender between said clamping elements and said main body structure and wherein said first clamping component being attached to a first side of said motorcycle fender, said second clamping component being attached to a second side of said motorcycle fender, and said third clamping component being attached to one of a leading end and a trailing end of said motorcycle fender.

12. The combination of motorcycle fender and motorcycle fender extension component for drilless assembly to either a leading end or trailing end of a motorcycle fender of claim 11 wherein said clamping elements each include a threaded receiving collar fixed in and through said main body structure, a threaded fastener in said collar and a clasp connected to said threaded fastener.

13. The combination of motorcycle fender and motorcycle fender extension component for drilless assembly to either a leading end or trailing end of a motorcycle fender of claim 12 wherein said clasp is a threaded clasp with a distal claw.

14. The combination of motorcycle fender and motorcycle fender extension component for drilless assembly to either a leading end or trailing end of a motorcycle fender of claim 11 wherein said motorcycle fender extension component main body structure side flanges are recessed side flanges to enhance positioning of said motorcycle fender extension component on said motorcycle fender to which it is attached to render it self-positioning.

15. The combination of motorcycle fender and motorcycle fender extension component for drilless assembly to either a leading end or trailing end of a motorcycle fender of claim 11 wherein said main body structure of said motorcycle fender extension component is symmetrical relative to said central axis.

16. The combination of motorcycle fender and motorcycle fender extension component for drilless assembly to either a leading end or trailing end of a motorcycle fender of claim 11 wherein said motorcycle fender extension component main body structure further includes an aerodynamically positioned pair of wings, one of each being located on said first side and said second side of said main body structure.

17. The combination of motorcycle fender and motorcycle fender extension component for drilless assembly to either a leading end or trailing end of a motorcycle fender of claim 16 wherein said pair of wings are symmetrical relative to said central axis.

18. The combination of motorcycle fender and motorcycle fender extension component for drilless assembly to either a leading end or trailing end of a motorcycle fender of claim 16 wherein each of said pair of wings extends outwardly and upwardly from said main body structure.

19. The combination of motorcycle fender and motorcycle fender extension component for drilless assembly to either a leading end or trailing end of a motorcycle fender of claim 18 wherein each of said pair of wings has inside surfaces that are flat and form angles of about ten to about seventy five degrees when measured from an imaginary traversing line crossing through said sides of said main body structure at a right angle to said central axis.

20. The combination of motorcycle fender and motorcycle fender extension component for drilless assembly to either a leading end or trailing end of a motorcycle fender of claim 19 wherein each of said pair of wings has inside surfaces that are flat and form angles of about twenty to about sixty degrees when measured from an imaginary traversing line crossing through said sides of said main body structure at a right angle to said central axis.

\* \* \* \* \*